United States Patent [19]

Anthony

[11] 4,295,935
[45] Oct. 20, 1981

[54] BIMETALLIC SPACER MEANS FOR A NUCLEAR FUEL ASSEMBLY

[75] Inventor: Andrew J. Anthony, Tariffville, Conn.

[73] Assignee: Combustion Engineering, Inc., Windsor, Conn.

[21] Appl. No.: 25,228

[22] Filed: Mar. 29, 1979

[51] Int. Cl.³ ............................................. G21C 3/30
[52] U.S. Cl. .................................. 376/285; 376/442; 376/462
[58] Field of Search .................................. 176/76, 78

[56] References Cited
U.S. PATENT DOCUMENTS

4,058,436 11/1977 Anthony .............................. 176/78
4,135,974 1/1979 Garkisch .............................. 176/87

Primary Examiner—Donald P. Walsh
Attorney, Agent, or Firm—Arthur E. Fournier, Jr.

[57] ABSTRACT

A bimetallic spacer means designed to be cooperatively associated with a nuclear fuel assembly and operative to resist the occurrence of in-reactor bowing of the nuclear fuel assembly. The subject bimetallic spacer means in accord with one embodiment of the invention includes a member formed, at least principally, of zircaloy to which are attached a plurality of stainless steel strips. The latter stainless steel strips are located on the external surface of the zircaloy member and with the major axis of each of the plurality of stainless steel strips extending substantially perpendicular to the major axis of the zircaloy member. In accord with another embodiment of the invention, the subject bimetallic spacer means includes a member formed at least principally of zircaloy to which a plurality of stainless steel strips are attached so as to be positioned thereon externally thereof and with the major axis of each of the plurality of stainless steel strips extending substantially parallel to the major axis of the zircaloy member. In accord with a further embodiment of the invention, the stainless steel strips are attached to preselected members, each embodying at least a cladding of zircaloy, which are located in the rows of fuel rods that define the perimeter of the fuel matrix of the nuclear fuel assembly. In each of the embodiments, the stainless steel strips during power production expand outwardly to a greater extent than do the members to which the stainless steel strips are attached, thereby forming stiff springs which abut against like bimetallic spacer means with which the other nuclear fuel assemblies are provided in a given nuclear reactor core to thus prevent the occurrence of in-reactor bowing of the nuclear fuel assemblies. Namely, the stainless steel strips expand laterally relative to the fuel assembly and thereby occupy the space adjacent to the external surface of the fuel assembly, into which portions of the fuel assembly would otherwise be receivable should they undergo bowing.

7 Claims, 9 Drawing Figures

BIMETALLIC SPACER MEANS FOR A NUCLEAR FUEL ASSEMBLY

BACKGROUND OF THE INVENTION

This invention relates to nuclear reactor fuel assembly grids, and, more particularly, to a bimetallic spacer means operative to resist the occurrence of in-reactor bowing of nuclear reactor fuel assemblies.

The prior art is replete with a multiplicity of teachings of various forms of nuclear fuel assembly grids that have been proposed for use in nuclear reactor cores. One particularly striking aspect of the contents of these prior art teachings is the diversity of structural configurations that have been proposed for embodiment in such fuel assembly grids.

Generally speaking, there are two major functions, which fuel assembly grids are intended to perform. First of all, such grids are used to provide the individual fuel rods, which collectively comprise a fuel assembly, with lateral support. The need for such support is occasioned in large measure by the very nature of the construction of a fuel rod. Namely, each fuel rod commonly consists of a multiplicity of fuel pellets that are arranged in a multiple layer configuration. Moreover, each fuel rod normally is of substantial length. Accordingly, even though the fuel pellets generally are to be found encased in a cladding tube, a need still exists to provide a fuel rod with the aforementioned support to insure that the latter will not undergo lateral displacement to an unacceptable degree, i.e., to a degree which potentially could adversely affect the operation of the nuclear reactor. The susceptiveness of the fuel rods to undergo lateral displacement stems from the nature of the forces to which the fuel rods are subjected. For instance, included in the forces to which reference is had here are the compression spring forces that are being exerted on the ends of the rods, the forces applied to the fuel rods as a consequence of the coolant flow in the fuel assembly, etc.

The other major function, which is performed by the fuel assembly grid, is that of insuring that the desired spacing between the fuel rods, which collectively comprise the fuel assembly, is being maintained. The existence of proper spacing between the individual fuel rods is important, both from the standpoint of insuring that excessive flux peaking occasioned by the existence of improper spacing between fuel rods and the fuel assembly is prevented, and from the standpoint of insuring that proper coolant flow between the fuel rods and the fuel assembly is maintained. Unequal distribution of coolant flow between individual fuel rods can give rise to overheating and eventually cause hot spots to develop within the fuel assembly.

Another important factor which must be borne in mind in proposing for use any particular design for a nuclear fuel assembly is that the support and spacing functions intended to be performed thereby must be capable of being accomplished in such a manner as to not interfere with the process of inserting and removing fuel rods into and from a fuel assembly. Namely, the nuclear fuel assembly grid must be operative to provide the desired lateral support to the individual fuel rods, which collectively comprise the fuel assembly, and to provide the desired spacing therebetween when the fuel rods are emplaced in a fuel assembly, and concomitantly must possess the capability to make possible the facile insertion and/or removal of the fuel rods into and/or from the fuel assembly, when such action is required.

Apart from the need to provide support to the fuel rods themselves, some attention has been directed more recently to the desirability of improving the strength characteristics of the nuclear fuel assembly grid itself. Specifically, reference is had here to the recognition that has been given to the desirability of improving the strength of the fuel assembly grid per se so as to insure the ability of the fuel assembly to withstand the possible subjection thereof to seismic loading. As set forth in U.S. Pat. No. 4,058,436, which issued to the inventor of the subject matter of the instant application and which is assigned to the same assignee as the present invention, such seismic loading could give rise to the subjection of the fuel assembly to severe lateral stresses that, in turn, could adversely affect the operation of the nuclear reactor in which such a fuel assembly is contained. The nature of such adverse effects is clearly outlined in applicant's above-referred to earlier U.S. Patent. It can thus be seen that in proposing a design for a nuclear fuel assembly grid, another consideration which desirably should be taken into account in addition to the need to provide lateral spacing to the fuel rods and to establish the proper spacing between the fuel rods is that of the impact, which seismic loading might have on the fuel assembly.

For the reason set forth in the aforereferenced U.S. Patent, it is important that the strengthening of the fuel assembly grid be accomplished in such a manner as to not detrimentally influence the operating efficiency of the nuclear reactor. That is, it is desirable that the fuel assembly grid be provided with additional rigidity in a manner which will not significantly increase the neutron absorption propensity of the grid. In this regard, as a material zircaloy is known to have a lower neutron capture cross-section than does stainless steel or inconel. On the other hand, as a material stainless steel and inconel are known to possess a higher degree of mechanical strength than does zircaloy.

With the latter in mind, in accord with the teachings of the above-referred to U.S. Patent, a fuel assembly is provided, which has cooperatively associated therewith a multiplicity of all-zircaloy grids and one all-stainless steel grid. Each of the all-zircaloy grids embodies a unique construction that is operative to increase the strength characteristics thereof. Moreover, by employing such all-zircaloy grids, which are characterized by their superior crush strength, in combination with a suitably positioned all-stainless steel grid, a fuel assembly, which is so equipped, is provided that possesses sufficient overall strength to successfully resist the severe lateral stresses that are anticipated under conditions of seismic loading.

In addition to the lateral stresses to which a fuel assembly may be subjected under seismic loading conditions, there are reasons to believe that under certain conditions fuel assemblies equipped with prior art forms of fuel assembly grids, may, for reasons of yet not totally explained, exhibit a susceptiveness to undergo bowing. The term bowing as used herein is intended to refer to that condition of a fuel assembly wherein one or more portions thereof have undergone lateral displacement. Although it has not been caused by seismic loading, such bowing of the fuel assembly is undesired equally as much as the lateral displacement which a fuel assembly undergoes as a consequence of seismic loading. In this regard, the reasons why such bowing of the fuel assembly is undesirable are basically the same as those which are to be found set forth in the U.S. Patent previously referred to hereinabove. Namely, by way of exemplification, such bowing can give rise to the permanent deformation of the fuel assembly. Moreover, the bowing of the fuel assembly may become sufficiently severe as to cause the fuel assembly to impact against adjacent fuel assemblies with adverse consequences. There are other types of damage that are equally likely to occur in the event that such bowing of the fuel assembly takes place with equally detrimental effects on the operation of the nuclear reactor.

Consequently, there has been shown to exist in the prior art a need for a nuclear fuel assembly grid that in addition to possessing the capability of providing lateral support to the fuel rods that collectively comprise the fuel assembly and the capability of effecting the desired spacing between the fuel rods also possesses the capability of providing the fuel assembly with sufficient crush strength to withstand the severe lateral stresses imposed thereupon under seismic loading conditions as well as the ability to resist any susceptiveness on the part of the fuel assembly to undergo bowing. More specifically, a need has been shown to exist for such a grid, which would be operative to prevent the fuel assembly from undergoing lateral displacement that exceeds certain preestablished acceptable limits. Furthermore, a characteristic, which any such grid capable of fulfilling the above-stated objectives must also embody, is the fact that additionally it exhibits a relatively low propensity for neutron absorption.

It is, therefore, an object of the present invention to provide a new and improved bimetallic spacer means particularly suited to be cooperatively associated with a nuclear fuel assembly of the type that is employable in the core of a nuclear reactor.

It is another object of the present invention to provide such a bimetallic spacer means which includes means operative, when the bimetallic spacer means is cooperatively associated with a fuel assembly, to provide lateral support to the fuel rods that collectively comprise the fuel assembly.

It is still another object of the present invention to provide such a bimetallic spacer means which includes means operative, when the bimetallic spacer means is cooperatively associated with a fuel assembly, to provide the proper spacing between the individual fuel rods that collectively comprise the fuel assembly.

A further object of the present invention is to provide such a bimetallic spacer means, which is characterized by its improved crush strength, such that when the bimetallic spacer means is cooperatively associated with a fuel assembly, it is operative to enable the fuel assembly to withstand the severe lateral stresses imparted thereto under seismic loading conditions.

A still further object of the present invention is to provide such a bimetallic spacer means, which is operative when cooperatively associated with a fuel assembly to enable the fuel assembly to resist any susceptiveness thereof to undergo inreactor bowing beyond certain specified preestablished acceptable limits.

Yet another object of the present invention is to provide such a bimetallic spacer means, which is characterized in the fact that it exhibits a relatively low propensity for neutron absorption.

Yet still another object of the present invention is to provide such a bimetallic spacer means, which is relatively inexpensive to manufacture, relatively easy to employ, and which is capable of providing effective and reliable operation.

SUMMARY OF THE INVENTION

In accordance with the present invention, there is provided a novel and improved bimetallic spacer means designed to be cooperatively associated with a fuel assembly and operative to resist in-reactor bowing of the fuel assembly when the latter is employed in a nuclear reactor core. In accord with one aspect of the invention, the bimetallic spacer means includes an all-zircaloy perimeter grid to which are attached a plurality of stainless steel strips. The plurality of stainless steel strips are mounted on the external surface of the perimeter grid and each has its major axis extending substantially perpendicular to the major axis of the perimeter grid. During power production the plurality of stainless steel strips expand outwardly to a greater extent than does the all-zircaloy perimeter grid. In their expanded state, the plurality of stainless steel strips function in the manner of stiff springs to effectively resist any tendency on the part of the fuel assembly to undergo in-reactor bowing.

In accord with another aspect of the present invention, the bimetallic spacer means again includes an all-zircaloy perimeter grid to which a plurality of stainless steel strips are attached. However, in this instance the plurality of stainless steel strips are positioned on the external surface of the perimeter grid so that the major axis of each of the plurality of stainless steel strips extends substantially parallel to the major axis of the perimeter grid. Here also, the plurality of stainless steel strips function in the same manner as that described in the preceding paragraph. Namely, during power production, the plurality of stainless steel strips expand and function like stiff springs to limit any in-reactor bowing of the fuel assembly to within acceptable limits.

In accord with still another aspect of the present invention, certain preselected rods, each having a zircaloy cladding associated therewith, are provided with a stainless steel strip. Those rods, which are selected to be provided with a stainless steel strip, are all located within the rows of fuel rods that define the perimeter of the fuel matrix of the fuel assembly. The stainless steel strips are positioned on the rods so as to be located on an outwardly exposed surface thereof. The stainless steel strips, in this instance also, function in the same manner as the stainless steel strips described in the two preceding paragraphs. Namely, the strips during power production expand and take on the characteristics of stiff springs having the ability to enable the fuel assembly to resist any susceptiveness on the part thereof to undergo in-reactor bowing beyond what is considered to be acceptable limits.

DESCRIPTION OF THE ILLUSTRATED EMBODIMENTS

Figures 1, 2:
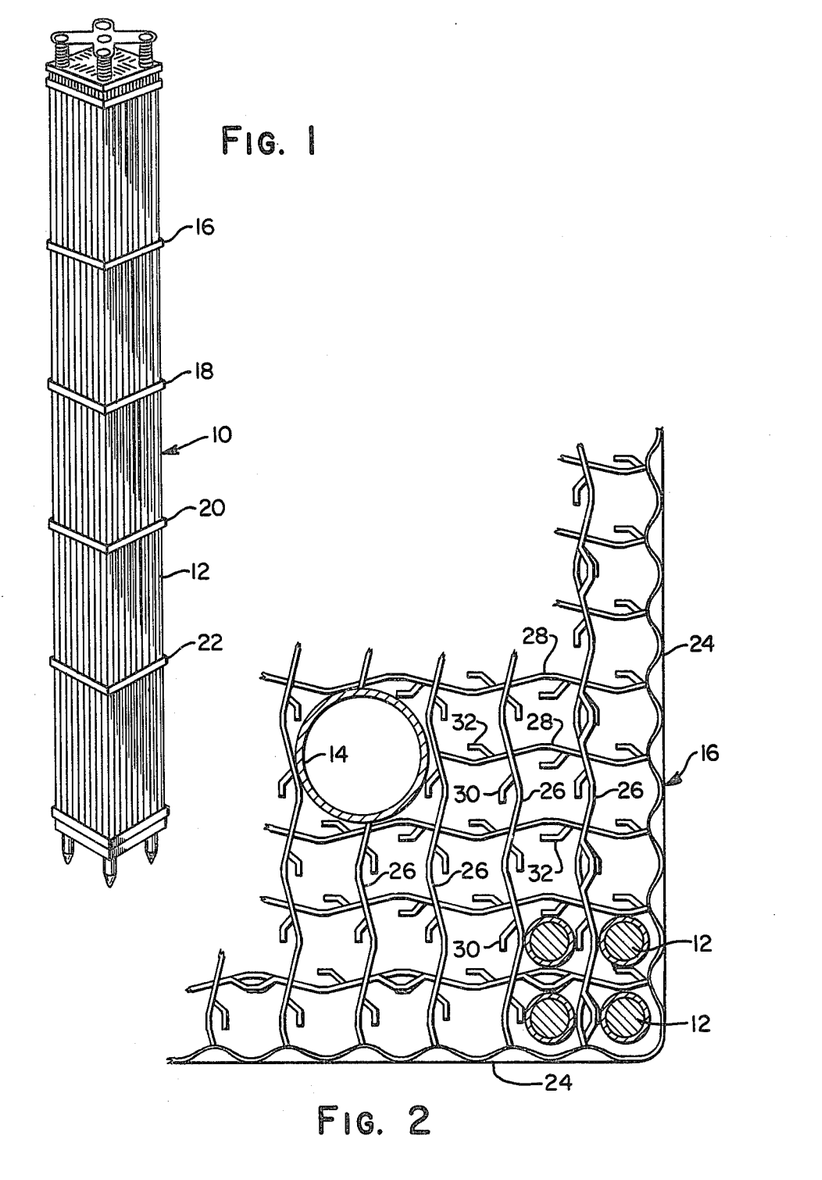
FIG. 1 is a perspective view of a nuclear reactor fuel assembly having bimetallic spacer means constructed in accordance with the present invention cooperatively associated therewith.
FIG. 2 is a plan view of a segment of the nuclear fuel assembly grid portion of a bimetallic spacer means constructed in accordance with the present invention.

Referring now to the drawing, and more particularly to FIG. 1 thereof, there is depicted therein a nuclear reactor fuel assembly, generally designated therein by reference numeral 10, having a bimetallic spacer means constructed in accordance with the present invention cooperatively associated therewith. Inasmuch as the subject matter of the present invention does not reside in the nature of the construction per se of the nuclear reactor fuel assembly 10, but rather in the nature of the construction and the mode of operation of the bimetallic spacer means that is designed to be cooperatively associated with the fuel assembly 10, it is not deemed necessary for purposes of obtaining an understanding of the present invention to describe herein and/or to illustrate in the drawing the nature of the construction of the fuel assembly 10. Rather, it is deemed sufficient to merely note that the fuel assembly 10 embodies a multiplicity of fuel rods 12, which collectively comprise the fuel assembly 10. In addition, note is taken of the fact that the fuel assembly 10 has associated therewith a plurality of nuclear fuel assembly spacer grids 16, 18, 20 and 22. For a more complete description and/or illustration of the nature of the construction and the mode of operation of the nuclear fuel assembly 10, reference may be had to the teachings thereof contained in the prior art.

In accord with the best mode embodiment of the present invention, the nuclear fuel assembly spacer grids designated by reference numeral 16 and 22 in FIG. 1 of the drawing are of conventional construction. However, the two centermost nuclear fuel assembly grids, i.e., those designated in FIG. 1 by reference numerals 18 and 20 each embody the construction of a bimetallic spacer means constructed in accordance with the present invention. Insofar as concerns the internal construction thereof, all four of the spacer grids 16, 18, 20 and 22 are substantially alike. Basically, it is with regard to the external features thereof that the spacer grids 18 and 20 differ in construction from the spacer grids 16 and 22.

With further regard to the matter of the internal construction of the spacer grids 16, 18, 20 and 22, a description thereof will now be had with reference particularly to FIG. 2 of the drawing. As shown in FIG. 2, the spacer grid 16 which it is to be understood exemplifies the internal construction of all four of the spacer grids 16, 18, 20 and 22 that are cooperatively associated with the fuel assembly 10 of FIG. 1, includes a multiplicity of perimeter strips 24. The latter strips 24 are suitably joined at the ends thereof to form a closed, substantially rectangular structure, suitably dimensioned to the external cross-sectional dimensions of the fuel assembly 10. A suitable number of interior grid members 26 comprising a first set thereof, extend in a parallel manner in a first direction between a first pair of perimeter strips 24 that comprise two of the substantially parallelly extending sides of the spacer grid 16. In addition, a suitable number of interior grid members, designated in FIG. 2 by reference numeral 28, comprising a second set thereof extend in a parallel manner in a second direction, the latter being substantially perpendicular to the aforementioned first direction in which the members 26 extend, between a second pair of perimeter strips 24 that comprise the other two of the substantially parallelly extending sides of the spacer grid 16.

As will be readily apparent from FIG. 2, the first set of interior grid members 26 are suitably interleaved with the second set of interior grid members 28 so as to provide the spacer grid 16 with a configuration that resembles what is often referred to in the art as an egg crate type configuration. Projecting inwardly from the first set of interior grid members 26 is a multiplicity of tang-like springs 30. In a like fashion, the second set of interior grid members 28 is also provided with a multiplicity of inwardly projecting tang-like members 32. In a manner well known to those skilled in the art, the first set of grid members 26 and the second set of grid members 28 are operative to define a multiplicity of compartments, thus the resemblance to an egg crate, suitable for receiving a fuel rod 12 or a control rod 14 therein in supported relation thereto. More specifically, as previously known in the art, the aforedescribed tang-like springs 30 and 32 are operative to exert a spring biasing force against the circumference of the fuel rod 12 or the control rod 14, as the case may be. Namely, each of the fuel rods 12 and control rods 14 is engaged at a multiplicity of points around the circumference thereof by the tang-like springs 30 and 32 and selected portions of the interior grid members 26 and 28. The effect of this engagement thereof is that the tang-like springs 30 and 32 are operative in conjunction with the engaged portions of the interior grid members 26 and 28 to perform a dual function, i.e., to provide the fuel rods 12 and the control rods 14 with lateral support and to effect the proper spacing of the fuel rods 12 and the control rods 14 each within an appropriate one of the corresponding compartments defined by the intersection of the first set of interior grid members 26 with the second set of interior grid members 28, and thereby the desired spacing of the fuel rods 12 and the control rods 14 one with another. A concomitant result of effecting the proper lateral support and spacing of the fuel rods 12 and the control rods 14 is to insure the proper coolant flow within the fuel assembly 10. Finally, note is taken of the fact that in accord with the illustrated embodiment thereof, the permanent strips 24 each are provided with undulating edge portions, and the tang-like springs 30 and 32 are formed by being bent out of the plane of the grid members 26 and 28, respectively. However, it is to be understood that the tang-like springs 30 and 32 could be formed in some other manner without departing from the essence of the present invention. Moreover, the perimeter strips 24 could embody some other configuration without departing from the essence of the present invention. In summary, therefor, insofar as the spacer grids 16, 18, 20 and 22 are concerned, the importance of the tang-like springs 30 and 32, the interior grid members 26 and 28 and the perimeter strips 24 resides not in the nature of the construction per se thereof, but in the ability thereof to perform the functions desired therefrom; namely, to provide lateral support and to effect the proper spacing of the fuel rods 12 and the control rods 14.

Figures 3, 4:
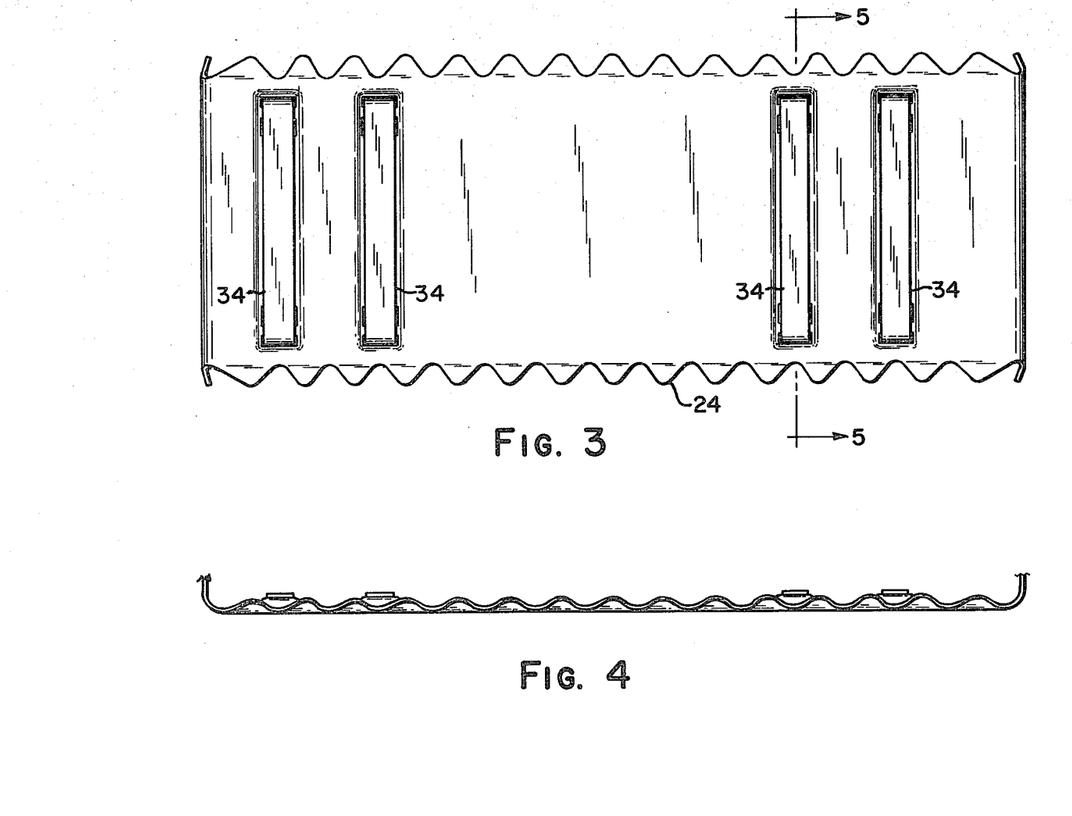
FIG. 3 is a side elevational view of a portion of a first embodiment of a bimetallic spacer means constructed in accordance with the present invention.
FIG. 4 is a plan view of a portion of the embodiment of a bimetallic spacer means constructed in accordance with the present invention, which is illustrated in FIG. 3.
Figure 5:
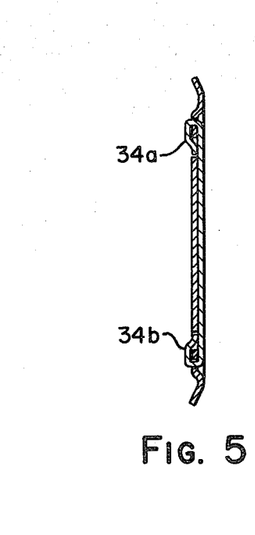
FIG. 5 is a cross-sectional view of the portion of the bimetallic spacer means that is illustrated in FIG. 3, taken substantially along the line 5—5 in FIG. 3.

Continuing with the description of the two centermost spacer grids 18 and 20 that comprise bimetallic spacer means in accordance with the present invention, reference will be had for this purpose, particularly to FIGS. 3-5 of the drawing wherein one embodiment of the invention is illustrated. It is to be understood, however, for purposes of the description that follows, that the bimetallic spacer means 18 and 20 embody the same internal construction as the spacer grid 16, i.e., the internal construction that has been set forth in the preceding paragraphs, and that accordingly the bimetallic spacer means 18 and 20 each, therefore, preferably embody means operative to provide lateral support to the fuel rods 12 and control rods 14, and to effect the proper spacing amongst the fuel rods 12 and the control rods 14. The perimeter strip 14, which is made entirely of zircaloy and which is undulated in configuration, in accord with the embodiment of the invention depicted in FIGS. 3-5, additionally has cooperatively associated therewith a plurality of stainless steel strips 34 in a manner yet to be described. Preferably the stainless steel strips 34 are formed from one of the 300 series stainless steels that are characterized by their relatively high coefficient of thermal expansion. The 300 series nomenclature is a classification applied to stainless steel materials, which is well recognized in the industry.

In the interest of maintaining simplicity of illustration in the drawing, the perimeter strip 24 is depicted in FIG. 3 as being provided with a total of only four stainless steel strips 34. However, in accord with the best mode embodiment of the invention it is contemplated that approximately eight such stainless steel strips 34 would be cooperatively associated with the perimeter strips 24 so as to be secured thereto in equally spaced relationship one to another. However, a greater or a lesser number of stainless steel strips 34 could be associated with each of the perimeter strips 24 without departing from the essence of the present invention. The exact number of stainless steel strips 34, which are employed, is a function of the length of the perimeter strip 24, and as will be described herein more fully subsequently the amount of spring force that desirably should be derived from the stainless steel strips 34.

Although the stainless steel strips 34 may be cooperatively associated with the perimeter strips 24 through the use of any suitable means of securement, in accord with the best mode embodiment of the invention, the stainless steel strips 34 are secured to the perimeter strip 24 in the manner depicted in FIG. 5 of the drawing. Namely, the perimeter strip 24 has a multiplicity of pairs of openings (not shown) formed therein. The number of pairs of openings (not shown) so formed in the perimeter strip 24 equal in number at least double the number of stainless steel strips 34 desired to be attached to the perimeter strip 24. More specifically, a plurality of pairs of openings (not shown) are suitably formed along each of the longitudinally extending edges of the perimeter strip 24 with the openings (not shown) in each pair of rows thereof being aligned with and equally spaced from each other. In addition, the perimeter strip 24 preferably embodies pocket-like recesses for receiving therein the strips 34.

As best understood with reference to FIG. 5, each stainless steel strip 34 is assembled to the perimeter strip 24 in the following manner. Namely, the ends 34a and 34b of the stainless steel strip 34 are inserted through the outermost opening (not shown) of each pair thereof. Thereafter, the ends 34a and 34b of the stainless steel strip 34 are bent inwardly towards the longitudinally extending center line of the perimeter strip 24. In this bent condition, the tips of the ends 34a and 34b of the stainless steel strips 34 are insertable into the other opening (not shown) of each pair thereof. When so positioned in the other opening (not shown) of each pair thereof, the tips of the ends 34a and 34b of the stainless steel strip 34 are in contacting relation with the inner surface of the stainless steel strip 34, i.e. the surface of the latter, which is located in juxtaposed relation to the perimeter strip 24. It is thus possible for purposes of effecting a secure attachment of the stainless steel strip 34 to the perimeter strip 24 to weld the tips of the ends 34a and 34b of the stainless strip 34 to the main body portion thereof. Such a weld is feasible, because it involves welding a stainless steel member to a stainless steel member, thereby avoiding the difficulties known to be associated with the attempted welding of a stainless steel member to a zircaloy member.

Before setting forth hereinafter a description of the mode of operation in general of a bimetallic spacer means constructed in accordance with the present invention and of the mode of operation in particular of the embodiment of bimetallic spacer means to which FIGS. 3-5 of the drawing are directed, it is deemed desirable to first take cognizance of the fact that the extent to which a fuel assembly can bow is a function of the space that exists between the fuel assemblies 10 located in a reactor core as well as the number of fuel assemblies 10 located therein. As noted previously hereinbefore, the loading on a fuel assembly 10, which induces the latter to bow, includes, for instance, the axial compressive force exerted on the fuel assembly 10 by the fuel assembly holddown springs (not shown), the lateral hydraulic flow forces from the coolant flow applied to the fuel assembly 10, etc. Such forces in conjunction with irradiation induced creep of zircaloy fuel assembly structure are capable of producing bowing of the fuel assembly 10. Moreover, it is known that the longer the fuel assembly 10, the more susceptible it is to bowing. Some of the consequences that may flow from the occurrence of such bowing of the fuel assemblies 10 housed in the reactor core include the possible need to derate the nuclear power plant, the experiencing of severe problems in refueling the bowed, i.e., bent, fuel assemblies 10, etc. Thus, it can be seen that the elimination of fuel assembly bowing is a desirable objective. Moreover, one way of inhibiting the occurrence of fuel assembly bowing is to eliminate to the extent possible the space available between fuel assemblies 10 in which it is possible for bowing to take place. In accordance with the present invention, a bimetallic spacer means has been provided, which is operative to effect a minimization of the space that is available between the fuel assemblies 10 for bowing to occur therein.

With regard to the embodiment of bimetallic spacer means to which FIGS. 3-5 are directed, the manner in which such elimination of the space between fuel assemblies 10 is effected is as follows: As the spacer grids 18 and 20 are heated by the coolant circulating through the fuel assembly 10, the stainless steel strips 34, which are attached to the perimeter strips 24 of the spacer grids 18 and 20, expand outwardly, i.e., laterally, from the perimeter of the latter grids 18 and 20 to form stiff springs. With the stainless steel strips 34 fully expanded, the space between adjacent fuel assemblies 10 becomes occupied by the strips 34, thus leaving virtually no room in which for the fuel assemblies 10 per se to move laterally, i.e., undergo lateral displacement, and hence the elimination of the potential for the fuel assemblies 10 equipped with a bimetallic spacer means of the present invention to bow. Note is taken here of the fact that a two inch long stainless steel strip 34, made of one of the 300 series stainless steels will expand laterally about 0.09 inches with its ends fixed to the all-zircaloy perimeter strip 24 in the manner depicted in FIG. 5. Upon cool down of the reactor core, the stainless steel strips 34 return to their original position relative to the perimeter strip 24, i.e., in juxtaposed relation thereto, and, therefore, the stainless steel strips 34 do not present any interference to the accomplishment of the refueling of the fuel assemblies 10 equipped therewith.

Figure 6:
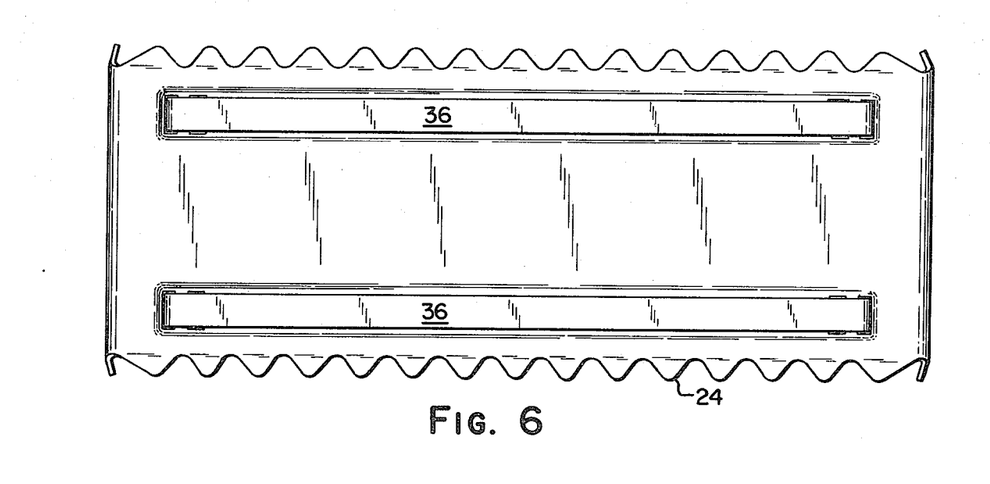
FIG. 6 is a side elevational view of a portion of a second embodiment of a bimetallic spacer means constructed in accordance with the present invention.
Figure 7:
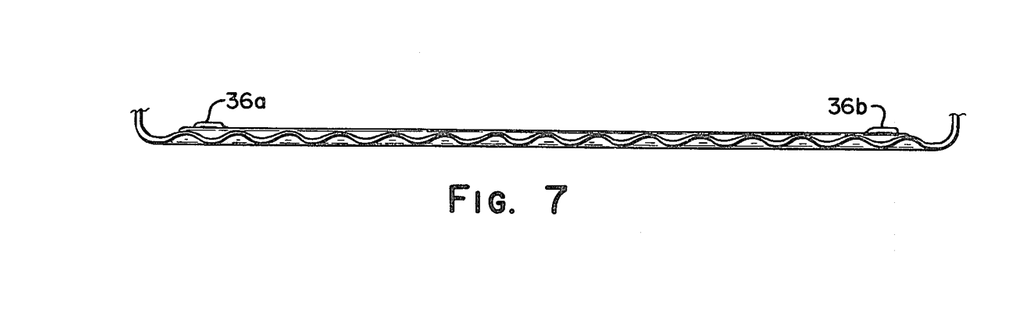
FIG. 7 is a plan view of a portion of the embodiment of a bimetallic spacer means constructed in accordance with the present invention, which is illustrated in FIG. 6.

In accord with a second embodiment of bimetallic spacer means constructed in accordance with the present invention, i.e., the embodiment thereof which can be found illustrated in FIGS. 6 and 7 of the drawing, the perimeter strips 24 of the two centermost spacer grids, i.e., grids 18 and 20 of the fuel assembly 10 of FIG. 1, are each provided with a plurality of stainless steel strips 36. The latter strips 36 are similar to the stainless steel strips 34, which have been described hereinabove and which are found illustrated in FIGS. 3-5 of the drawing. Namely, the strips 36 like the strips 34 are preferably each made of a stainless steel material selected from amongst the 300 series of stainless steel. However, the strips 36 are substantially longer in length than are the strips 34. More specifically, the plurality of stainless steel strips 36, as best understood with reference to FIG. 6 of the drawing, are positioned relative to the perimeter strips 24 so as to be located in equally spaced relation one to another and so that the longitudinal axis of each of the plurality of stainless steel strips 36 extends parallel to the longitudinal axis of the corresponding perimeter strip 24, rather than perpendicularly thereto as in the case of the stainless steel strips 34.

Although not depicted in the drawing, in the interest of maintaining the simplicity thereof, it is to be understood that the plurality of stainless steel strips 36 are preferably attached to the perimeter strips 24 in the same manner as the stainless steel strips 34 are attached to the perimeter strips 24. The method of attachment of the strips 34 to the perimeter strips 24 has been described previously herein and can be found depicted in FIG. 5 of the drawing. Namely, each of the plurality of stainless steel strips 36, which in accord with the illustration thereof in FIG. 6 of the drawing comprise two in number, preferably has its respective ends 36a and 36b each inserted through a first one of a pair of openings (not shown). After insertion through the aforesaid openings (not shown), the ends 36a and 36b of the strips 36 are bent back in an inwardly direction relative to the ends of the perimeter strips 24, i.e., away from the ends of the strips 24. The tips of the ends 36a and 36b of the strips 36 are then inserted through the other one of each of the corresponding one of the aforesaid pairs of openings (not shown), whereupon the tips of the strips 36 are now positioned in contacting relation to the main portion of the strips 36. Thereafter, for purposes of effecting a secure attachment of the strips 36 to the perimeter strips 34, the tips of the strips 36 are welded to the main portions of the strips 36. As in the case of the stainless steel strips 34, the weld between the tips of the stainless steel strips 36 and the main body portions thereof is facile to make inasmuch as it involves simply welding stainless steel to stainless steel, and not stainless steel to zircaloy. Finally, although the perimeter strip 24 in FIG. 6 is illustrated as having a pair of stainless steel strips 36 associated therewith, it is to be understood that if so desired, some other number of strips 36 could also be utilized in association with the perimeter strip 24 without departing from the essence of the present invention. However, in determining the feasibility of employing some other number of strips 36 with each perimeter strip 24, the expansion capacity of the number of strips 36 selected for use must be taken into consideration in order to insure that the strips 36 that are being utilized retain the ability to withstand the susceptability of the fuel assembly 10 to bowing. Finally, as in the case of the FIGS. 3-5 embodiment of the invention, the perimeter strip 24 preferably embodies pocket-like recesses for receiving therein the strips 36.

The mode of operation of the stainless steel strips 36 is substantially the same as that of the stainless steel strips 34 which has been described previously. Namely, as the spacer grids 18 and 20 equipped with the stainless steel strips 36 become heated by the coolant circulating through the fuel assembly 10, the stainless steel strips 36 expand outwardly, in accordance with their respective coefficient of thermal expansion, away from the perimeter of the grids 18 and 20. Inasmuch as the perimeter strips 24 of the grids 18 and 20 are made of zircaloy, which does not expand thermally as much as do the 300 series stainless steels, the perimeter strips 24 expand outwardly to a much lesser degree than do the stainless steel strips 36. In undergoing the aforedescribed thermal expansion, the stainless steel strips 36 take on the characteristics of stiff springs. When the stainless steel strips 36 become fully expanded, they tend to occupy completely the previously existing space between the fuel assemblies 10. Thus, there is no room for the fuel assemblies 10 to move, and hence bowing thereof is precluded. Upon the cooling down of the reactor core, the stainless steel strips 36 return to their original positions relative to the perimeters of the grids 18 and 20, and therefore do not interfere with any subsequent refueling of the fuel assemblies 10.

A third and final embodiment of bimetallic spacer means constructed in accordance with the present invention will now be described. For this purpose, reference will be had particularly to FIGS. 8 and 9 of the drawing. The third embodiment of bimetallic spacer means differs somewhat in construction from the other two embodiments of bimetallic spacer means, which have been previously described herein. Namely, this third embodiment of bimetallic spacer means still contemplates the utilization of a plurality of stainless steel strips, in this case stainless steel strips denoted in FIG. 8 of the drawing by the reference numerals 38 and 40. However, unlike the method of employment of the stainless steel strips 34 and 36 in the case of the two previously described embodiments of bimetallic spacer means, the stainless steel strips 38 and 40 are not attached to the perimeter strips 24 of the spacer grid 18 and 20 of the fuel assembly 10 of FIG. 1. Rather, the stainless steel strips 38 and 40, which, like the stainless steel strips 34 and 36, are preferably made from a stainless steel material selected from amongst the 300 series of stainless steels, are attached to selected rods 42 located, as depicted in FIG. 9, in the outermost rows of the fuel rods 12, i.e., the rows thereof that define the perimeter of the fuel matrix of the fuel assembly 10.

Figure 9:
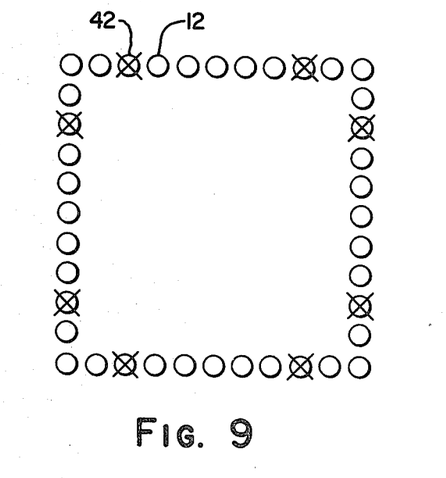
FIG. 9 is a plan view of the outermost rows of the fuel rods which define the perimeter of the fuel matrix of the fuel assembly, illustrating the location of the rods selected to be equipped with bimetallic spacer means constructed in accordance with the third embodiment of the present invention.

In accord with the illustrated form of the third embodiment of bimetallic spacer means, a total of eight such rods 42, suitably located as depicted in FIG. 9 of the drawing, in equally spaced relation around the periphery of the fuel matrix of the fuel assembly 10, are preferably employed. Moreover, the rods 42 preferably take the form of modified fuel rods 12. Namely, the rods 42 are filled with fuel pellets in the portions of the rod 42 located on either side of the section whereat the stainless steel strips 38 and 40 are attached thereto. Finally, as set forth above, the stainless steel strips 38 and the stainless steel strips, i.e., bands 40 are preferably attached to the rods 42 in the segment thereof, which lies between the centermost two spacer grid, i.e., the grids 18 and 20 as shown in FIG. 1. Accordingly, the stainless steel grids 38 and 40 cooperate with the spacer grids 18 and 20 to provide the fuel assembly 10 with the desired resistance to bowing. To this end, a set of stainless steel strips 38 and 40 may be mounted on the rods 42 in juxtaposed relation to each of the spacer grids 18 and 20, or, alternatively, only one set of the stainless steel strips 38 and 40 may be utilized whereupon the strips 38 and 40 would be mounted on the rods 42 so as to be interposed between the spacer grids 18 and 20 and so as to be located substantially in equally spaced relation to the grids 18 and 20.

Figure 8:
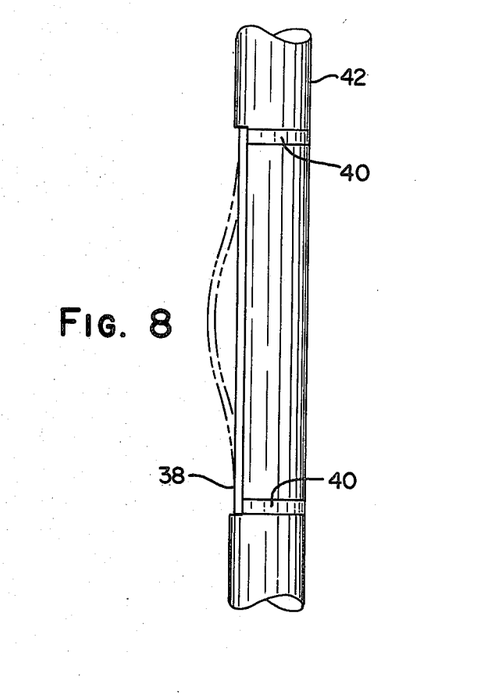
FIG. 8 is a side elevational view of a portion of one of the rods equipped with bimetallic spacer means constructed in accordance with a third embodiment of the present invention.

Irrespective of the number of sets of stainless steel strips 38 and 40 with which each of the rods 42 is provided, the function of the third embodiment of bimetallic spacer means in accordance with the present invention remains the same. Namely, the function thereof is to resist any tendency on the part of the fuel assembly 10 to bow, i.e., the same function as that performed by each of the other two embodiments of bimetallic spacer means in accordance with the present invention, which has been described hereinbefore. In this regard, the stainless steel strips 38 function much in the manner of the stainless steel strips 34 of the first embodiment of bimetallic spacer means of the present invention. That is, the stainless steel strips 38 are secured to the circumference of the rod 42, the latter being provided with an all-zircaloy cladding, so as to be externally located on the periphery of the fuel matrix of the fuel assembly 10 and so as to each have its major axis extending parallel to the longitudinal axis of the corresponding fuel assembly 10 and, more specifically, parallel to the longitudinal axis of the corresponding rod 42.

In accord with the mode of operation thereof, the heat from the coolant flowing in the fuel assembly 10 effects a thermal expansion of the stainless steel strips 38 causing the latter to expand outwardly, i.e., laterally, away from the external surface of the rods 42. In doing so, the stainless steel strips 38 take on the characteristics of stiff springs. As the strips 38 expand, they move into and occupy the space existing between adjacent fuel assemblies 10. Consequently, there is no room left into which the fuel assemblies 10 can move, and hence no room to accommodate any bowing on the part of the fuel assembly 10. As a reactor core cools down, the stainless steel strips 38 return to their original positions, i.e., so that they are located in substantially contacting relation to the exterior surface of the rods 42. When occupying their original positions, the rods 42 present no interference to the effectuation of the refueling of the fuel assembly 10. Note is taken here of the fact that the stainless steel strips 38 expand thermally to a significantly greater extent than do either the adjacent spacer grids 18 and 20 and the rods 42, which in the case of the former are of all-zircaloy construction and in the case of the latter embody an all-zircaloy cladding, because of the relative differences in the coefficient of thermal expansion of 300 series stainless steel as compared to that of zircaloy.

Insofar as concerns the method of attachment of the stainless steel strips 38 and 40 to the rods 42, any suitable method of securement may be employed. To this end, preferably the stainless steel strip 38 has its respective ends suitably attached such as by welding to each of the bands 40. The bands 40 which are of stainless steel construction circumferentially surround the rod 42.

Thus, in accordance with the present invention, there has been provided a new and improved bimetallic spacer means particularly suited to be cooperatively associated with a nuclear fuel assembly of the type that is employable in the core of a nuclear reactor. Moreover, the subject bimetallic spacer means of the present invention includes means operative, when the bimetallic spacer means is cooperatively associated with a fuel assembly, to provide lateral support to the fuel rods that collectively comprise the fuel assembly. In addition, in accord with the present invention, a bimetallic spacer means is provided which includes means operative, when the bimetallic spacer means is cooperatively associated with a fuel assembly, to provide the proper spacing between the individual fuel rods that collectively comprise the fuel assembly. Further, the bimetallic spacer means of the present invention is characterized by its improved crush strength, such that when the bimetallic spacer means is cooperatively associated with a fuel assembly, it is operative to enable the fuel assembly to withstand the severe lateral stresses imparted thereto under seismic loading conditions. Additionally, in accordance with the present invention a bimetallic spacer means is provided, which is operative when cooperatively associated with a fuel assembly to enable the fuel assembly to resist any susceptiveness thereof to undergo in-reactor bowing beyond certain specified preestablished acceptable limits. Also, the bimetallic spacer means of the present invention is characterized in the fact that it exhibits a relatively low propensity for neutron absorption. Furthermore, in accord with the present invention a bimetallic spacer means is provided, which is relatively inexpensive to manufacture, relatively easy to employ, and which is capable of providing effective and reliable operation.

While several embodiments of my invention have been shown, it will be appreciated that modifications thereof, some of which have been alluded to hereinabove, may still be readily made thereto by those skilled in the art. I, therefore, intend by the appended claims to cover the modifications alluded to herein as well as all other modifications, which fall within the true spirit and scope of my invention.

I claim:

1. In a fuel assembly of the type that is employable in a nuclear reactor core and has a definable exterior surface, the fuel assembly including a multiplicity of fuel rods and at least one nuclear fuel assembly spacer grid, said nuclear fuel assembly spacer grid including perimeter means and first and second means each structurally associated with said perimeter means, said perimeter means including a plurality of perimeter strips each made of zircaloy and having their ends interconnected together to form a closed perimetric structure positioned in surrounding relation to said multiplicity of fuel rods thereby defining the exterior surface of the fuel assembly, said first means being operable to provide lateral support to said multiplicity of fuel rods, said second means being operable to effect the proper spacing between said multiplicity of fuel rods, the improvement comprising expandable means cooperatively associated with said perimeter means so as to be operable to preclude in-reactor bowing of the fuel assembly, said expandable means comprising a plurality of expandable strips each being formed from a material having a high thermal coefficient of expansion than zircaloy, said plurality of expandable strips being attached to said plurality of perimeter strips in equally spaced relations one to another, said plurality of expandable strips being thermally expandable between a first position wherein said plurality of expandable strips are located in relatively close proximity to the exterior surface of the fuel assembly and a second position wherein said plurality of expandable strips are displaced laterally relative to the exterior surface of the fuel assembly so as to preclude in-reactor bowing of the fuel assembly by occupying the space adjacent to the exterior surface of the fuel assembly otherwise available for receiving portions of the fuel assembly that have undergone bowing.

2. In a fuel assembly, the improvement of expandable means as set forth in claim 1 wherein each of said plurality of expandable strips comprises a stainless steel strip formed of a material selected from amongst the 300 series stainless steels.

3. In a fuel assembly, the improvement of expandable means as set forth in claim 2 wherein said plurality of expandable strips is attached to said plurality of perimeter strips by having portions of each of said plurality of expandable strips welded to other portions of the same one of each of said plurality of expandable strips.

4. In a fuel assembly, the improvement of expandable means as set forth in claim 1 wherein said plurality of expandable strips are attached to said plurality of perimeter strips so that the major axis of each of said plurality of expandable strips extends substantially perpendicular to the major axis of each of said plurality of perimeter strips.

5. In a fuel assembly, the improvement of expandable means as set forth in claim 3 wherein said plurality of expandable strips are attached to said plurality of perimeter strips so that the major axis of each of said plurality of expandable strips extends substantially parallel to the major axis of each of said plurality of perimeter strips.

6. In a fuel assembly of the type that is employable in a nuclear reactor core and has a definable exterior surface, the fuel assembly including a multiplicity of fuel rods and at least one nuclear fuel assembly spacer grid, the outermost rows of said multiplicity of fuel rods defining the exterior surface of the fuel assembly and at least selected ones of said multiplicity of fuel rods located in said outermost rows of said multiplicity of fuel rods each embodying at least one portion thereof that is devoid of fuel, each of said selected ones of said multiplicity of fuel rods being encased in an all-zircaloy cladding, said nuclear fuel assembly spacer grid including perimeter means and first and second means each structurally associated with said perimeter means, said perimeter means being positioned in surrounding relation to said multiplicity of fuel rods, said first means being operable to provide lateral support to said multiplicity of fuel rods, said second means being operable to effect the proper spacing between said multiplicity of fuel rods, the improvement comprising expandable means cooperatively associated with said selected ones of said multiplicity of fuel rods so as to be operable to preclude in-reactor bowing of the fuel assembly, said expandable means comprising a plurality of sets of expandable strips each including a pair of circularly configured expandable strips mounted in equally spaced relation one to another on said one portion of each of said selected ones of said multiplicity of fuel rods and in circumferentially surrounding relation thereto and an interconnecting expandable strip having one end thereto affixed to one of said pair of circularly configured expandable strips and the other end thereof affixed to the other one of said pair of circularly configured expandable strips so that the major axis of said interconnecting expandable strip extends substantially parallel to the major axis of said selected ones of said multiplicity of fuel rods, said pair of circularly configured expandable strips and said interconnecting expandable strips of each of said plurality of sets of expandable strips being formed of a material having a higher thermal coefficient of expansion than zircaloy, said plurality of sets of expandable strips being thermally expandable between a first position wherein said interconnecting expandable strips are located in relatively close proximity to the exterior surface of the fuel assembly and a second position wherein said interconnecting expandable strips are displaced laterally relative to the exterior surface of the fuel assembly so as to preclude in-reactor bowing of the fuel assembly by occupying the space adjacent to the exterior surface of the fuel assembly otherwise available for receiving portions of the fuel assembly that have undergone bowing.

7. In a fuel assembly, the improvement of expandable means as set forth in claim 6 wherein said pair of circularly configured expandable strips and said interconnecting expandable strip of each of said plurality of sets of expandable strips each comprises a stainless steel strip formed of a material selected from amongst the 300 series stainless steels.

* * * * *